(12) United States Patent
Chakravarty

(10) Patent No.: US 11,048,628 B2
(45) Date of Patent: Jun. 29, 2021

(54) TAPE DATA ACCESS WITH RANDOM ACCESS FEATURES

(71) Applicant: StorageDNA, Inc., Irvine, CA (US)

(72) Inventor: Tridib Chakravarty, Irvine, CA (US)

(73) Assignee: StorageDNA, Inc., Irvine, CA (US)

( * ) Notice: Subject to any disclaimer, the term of this patent is extended or adjusted under 35 U.S.C. 154(b) by 195 days.

(21) Appl. No.: 16/367,730

(22) Filed: Mar. 28, 2019

(65) Prior Publication Data

US 2019/0310938 A1 Oct. 10, 2019

Related U.S. Application Data

(60) Provisional application No. 62/654,241, filed on Apr. 6, 2018.

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0682* (2013.01)

(58) Field of Classification Search
CPC .... G06F 3/0604; G06F 3/0611; G06F 3/0643; G06F 3/0655; G06F 3/0682; G06F 12/0802
See application file for complete search history.

(56) References Cited

U.S. PATENT DOCUMENTS

2018/0143783 A1\* 5/2018 Miyamura ............ G06F 3/0656

\* cited by examiner

*Primary Examiner* — Aracelis Ruiz
(74) *Attorney, Agent, or Firm* — Klein, O'Neill & Singh, LLP

(57) ABSTRACT

Retrieval of files containing audiovisual information from tape may be accelerated by storing non-sequentially read information in non-tape memory, and subsequently reading the file from tape, with reads of the non-sequentially read information fulfilled from the non-tape memory. In some embodiments a random access database is created when the file is opened or written to tape, and utilized to determine locations in the file of non-sequentially read information, or to determine the non-sequentially read information.

6 Claims, 11 Drawing Sheets

TAPE DATA ACCESS WITH RANDOM ACCESS FEATURES

CROSS REFERENCE TO RELATED APPLICATION

This application claims the benefit of the filing date of U.S. Provisional Patent Application No. 62/654,241, filed on Apr. 6, 2018, the disclosure of which is incorporated by reference herein.

BACKGROUND OF THE INVENTION

The present invention generally relates to tape storage of media or large files, and more particularly relates to recovery of media or large files stored on tape.

Media information, whether audio information, video information, or audiovisual information, is often stored in digital format. Digital media files, however, are often very large, consuming significant computer storage space. As long term storage of digital media files or other large files in on-board computer memory or even on computer hard drives may be costly, at least for substantial quantities of material, the files are often stored on magnetic tape. Unfortunately, storage of files on tape may pose difficulties when access to the digital media files or other large files is desired. Access to the digital media files may be desired for any number of reasons, including for editing, for transcoding, for scene or shot retrieval, or for distribution. Access to other large files may also be desired for any number of reasons.

Tapes in compliance with Linear Tape Open (LTO) technology may be used, decreasing possibility of differing hardware components being able to read a particular tape. In addition, data may be written to tape using a Linear Tape File System (LTFS) format, which generally allows data in tapes to be accessed using a file system format.

While using such tapes and taking such actions may reduce inconveniences in retrieving data from tape, retrieval of the data may still take excessive time considering that files retrieved may be relatively large. In addition, this time may be increased, and perhaps increased dramatically, if the files themselves have complex layouts, which may result in non-sequential reading of data from tape.

BRIEF SUMMARY OF THE INVENTION

Aspects of the invention relate to acceleration of audiovisual file retrieval from tape, and/or acceleration of retrieval of other large files. In some aspects of embodiments of the invention, a file containing information, for example audiovisual information, is written to tape, information relating to non-sequentially accessed information, indicating locations of objects within the file, is stored, and, for retrieval of the file from tape, the information relating to non-sequentially accessed information is accessed to determine locations for which non-sequential access will be performed within the file, and non-sequentially accessed information of the file on the tape is stored in cache memory, and the file as a whole is read, with accesses to audiovisual information of the file fulfilled from the tape and accesses to the non-sequential accessed information of the file on the tape fulfilled from the cache memory. In some embodiments the information relating to non-sequentially accessed information is address information for the non-sequentially accessed information of the file. In some embodiments the information relating to non-sequentially accessed information is the non-sequentially accessed information of the file. In some embodiments the information relating to non-sequentially accessed information is stored in a database, which in some embodiments is termed a random access database. In some embodiments the file is accessed from memory, a record of locations in the file accessed is generated, and the record is compared with patterns of particular types of files or types of content, so that a type of file or type of content may be determined for the file. In some embodiments the type of file or type of content provides an indication of locations of non-sequentially read metadata for the file.

Some embodiment provide a method useful in relation to processing of files containing audiovisual information, comprising: writing a source file containing audiovisual information stored in non-tape memory to a tape; and reading the source file from memory to obtain information relating to non-sequentially accessed information of the file; determining locations of at least some of the non-sequentially accessed information of the file; comparing the locations to patterns for non-sequential reads for files containing audiovisual information in different formats to determine a matching pattern; using the matching pattern to determine which of the information relating to non-sequentially accessed information is information relating to non-sequentially accessed metadata information; and storing the information relating to non-sequentially accessed metadata information of the file in memory other than the tape.

These and other aspects of the invention are more fully comprehended upon review of this disclosure.

DETAILED DESCRIPTION

Figure 1:
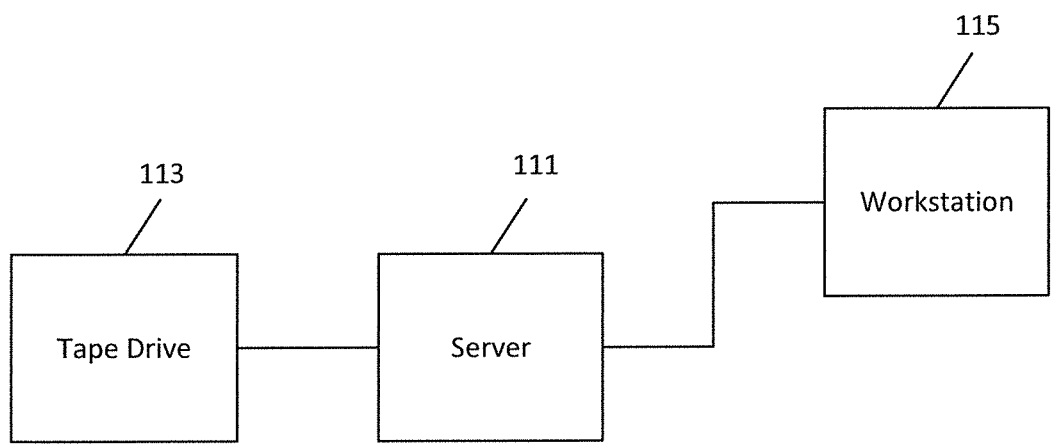
FIG. 1 is a block diagram of a system in accordance with aspects of the invention.

FIG. 1 is a block diagram of a system in accordance with aspects of the invention. In FIG. 1, a workstation 115 is coupled to a server 111, which controls operation of a tape drive 113. The workstation generally includes one or more processors, memory, and input/output (I/O) devices, including one or more display devices. In some embodiments the workstation may be, example, a personal computer. Generally the processors of the workstation are programmed by program instructions to perform audiovisual data transformation and/or editing functions. The server also generally includes one or more processors, memory, and I/O devices, of which the tape drive may be considered one. In some embodiments the processors of the server may also or instead be programmed by program instructions to perform audiovisual data transformation and/or editing functions, in which case the workstation may be omitted from the system. The tape drive provides access to at least one tape. In various embodiments the tape drive is an LTO compliant tape drive, preferably an LTO-6, LTO-7, or LTO-8 compliant tape drive. Preferably, tapes accessed by the tape drive are formatted to support file operations, and for example such tapes may be LTFS formatted tapes.

In operation, the workstation may have audiovisual information, for example of a movie, stored in memory. The audiovisual information may be stored in memory as a file. The audiovisual information generally includes video information, audio information, and metadata relating to the video information and the audio information. In some embodiments, however, the audiovisual information may omit one or the other of the video information or the audio information, although for simplicity of exposition the term "audiovisual" shall be used to refer to all or any of "audiovisual," "audio," or "video," herein, unless the context indicates otherwise. In operation, it may be desirable to store the audiovisual information to tape. Conversely, in operation it may also be desirable to retrieve audiovisual from tape, for example to allow for operations by the workstation relating to the audiovisual information. Preferably, the audiovisual information is stored as a file.

In various embodiments the workstation may instead or in addition have other information that is not audiovisual information, but, like audiovisual information, includes voluminous data and metadata relating to the voluminous data. For example, the voluminous data may be geophysical or other scientific data, data recorded from scientific or other data recording instruments, various large databases, or other data. For convenience, however, examples herein are primarily discussed with respect to audiovisual information, although it should be recognized that in many of the embodiments discussed herein the same comments may be applicable to other information that is not audiovisual information.

In accordance with aspects of the information, the workstation may command storage of the audiovisual information to tape, with the workstation for example sending the audiovisual information, and a command to store the audiovisual information on tape, to the server. When performing such an operation, or more generally upon loading the audiovisual into memory of the workstations or completion of storing the audiovisual information to tape and prior to deleting the audiovisual information from local storage, the workstation reads the file containing audiovisual information from local storage, and determines occurrences of non-sequential access to information of the file containing the audiovisual information. For such occurrences, the workstation stores indications of the locations in the file which were non-sequentially accessed. The indications of the locations may be stored in what may be termed a random access database. In some embodiments the random access database stores the information in a database format. In various embodiments, however, the random access database, despite its name, may store the information in some other format. The random access database includes, in various embodiments, information regarding offset locations, within the file, of non-sequentially, or randomly, accessed items in the file. For example, the file may include multiple audiovisual information objects, and, interspersed between the audiovisual information objects, metadata, for example in the form of headers and footers to the audiovisual information objects. In some embodiments the random access database also stores the information of the randomly accessed items in the file. In some embodiments the workstation stores the random access database in local memory, for later use. In some embodiments the workstation, in addition or instead, sends the random access database to the server, which may store the random access database on the same tape(s) as the file containing audiovisual information and/or in memory associated with the server and available to a plurality of workstations. In addition, in some embodiments the indications of the locations in the file which were non-sequentially accessed are compared to patterns of non-sequentially accessed information for various types of files, or files containing different types or formats of content. Based on such comparisons, in some embodiments the workstation may determine that other locations in the file are likely to be randomly accessed, with the workstation treating those other locations as if those locations were also randomly accessed. Conversely, in addition or instead, the workstation may determine that some locations in the file indicated as randomly accessed were likely to, in fact, not be randomly accessed during a read of the file from tape, and so not consider those locations as being randomly accessed. In addition, in some embodiments the workstation may only partially read the file and determine, for the partially read portions, occurrences of non-sequential reads. In some such embodiments, a pattern of the occurrences for the partially read portion may be compared to patterns of non-sequentially accessed information for various types of files, etc. Based upon a pattern match, the workstation may use information relating to the matching pattern in determining expected locations of information which will be randomly accessed during a read of the file from tape.

Also in accordance with aspects of the information, the workstation may command retrieval of the file containing audiovisual information from tape, for example to perform transcoding of the audiovisual information or some other operation. Prior to commanding retrieval the workstation accesses the random access database for the audiovisual information, from local memory if there stored, or by way of accessing memory of the server or by reading the random access database from tape. The workstation accesses the random access database to determine offsets of information that would not be part of a sequential read of the file containing audiovisual information of the tape, and/or the information itself in some embodiments. For example, in some embodiments a read of the file from tape would normally include non-sequential reads of the tape for possibly some metadata within the file containing the audiovisual information, and the workstation accesses the random access database to either determine the location of that metadata on tape or to obtain the metadata directly from the workstations own non-tape memory. In embodiments in which the workstation merely determines the location of that metadata on the tape, the workstation commands reading of the metadata from the tape. In most embodiments the metadata is read by commanding a read of a section of the tape beginning at each of the offsets for the metadata. In some embodiments the workstation stores the metadata in cache memory of the workstation. In some embodiments storage of the metadata in the cache is a result of reading of the metadata. In some embodiments the workstation explicitly commands the metadata to be stored in the cache. The workstation thereafter commands reading of the file of the audiovisual information from tape, with reading of the metadata fulfilled from the cache (or non-tape memory) of or accessible to the workstation, instead of from the tape.

Figure 2:
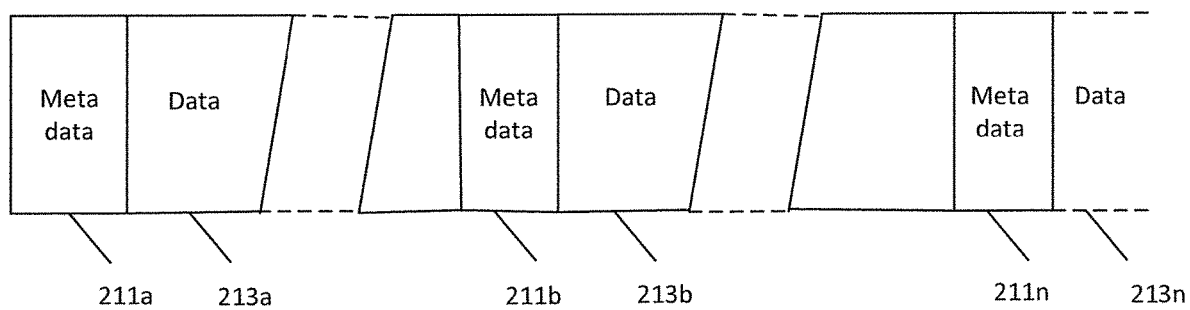
FIG. 2 illustrates an example layout of a file for audiovisual information as stored on tape.

FIG. 2 illustrates an example layout of a file containing audiovisual information as stored on tape. The file includes a plurality of blocks of metadata 211a-n, and a plurality of blocks of audiovisual data 213a-n. As illustrated in FIG. 2, the blocks are arranged sequentially on tape. In some embodiments the blocks may be arranged on tape in a discontinuous manner. The metadata generally includes information about the audiovisual data. The audiovisual data generally includes information for generating frames of video for display and/or audio information for aural presentation. In general the blocks of audiovisual data are much larger than the blocks of metadata. For example, in some embodiments each block of audiovisual data is at least one thousand times larger than each block of metadata. At times, the audiovisual data may be termed essence data, considering that the "essence" of audiovisual information comprises, or in some embodiments consists of, audiovisual data for visual and aural presentation. In general, blocks of metadata are dispersed between blocks of audiovisual data. In some embodiments at least one block of metadata is between any two blocks of audiovisual data. In some embodiments each block of audiovisual data is preceded by a header block of metadata. In some embodiments each block of audiovisual data is succeeded by a footer block of metadata. In some embodiments each block of audiovisual data is preceded by a header block of metadata and succeeded by a footer block of metadata.

Figure 3:
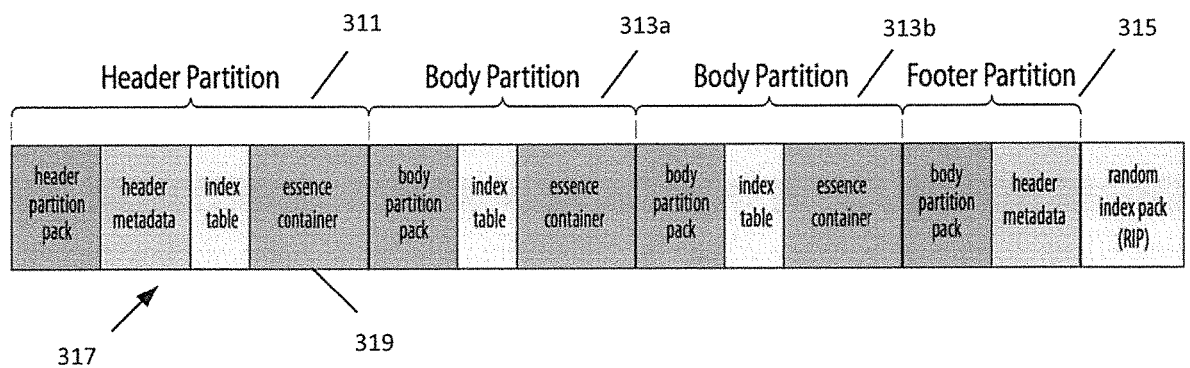
FIG. 3 illustrates another example layout of a file for audiovisual information.

FIG. 3 illustrates another example layout of a file containing audiovisual information. In the example of FIG. 3, the file includes a header partition 311, a plurality of body partitions (with two body partitions 313a,b illustrated in FIG. 3), and a footer partition 315. Using the header partition as an example, the partition includes metadata 317 comprising a header partition pack, header metadata, and an index table. The header partition also includes an essence container 319, which stores audiovisual data. In general, the essence container is significantly larger than a combination of the header partition pack, header metadata, and index table, and in some embodiments may be at least one thousand times larger.

Figure 4:
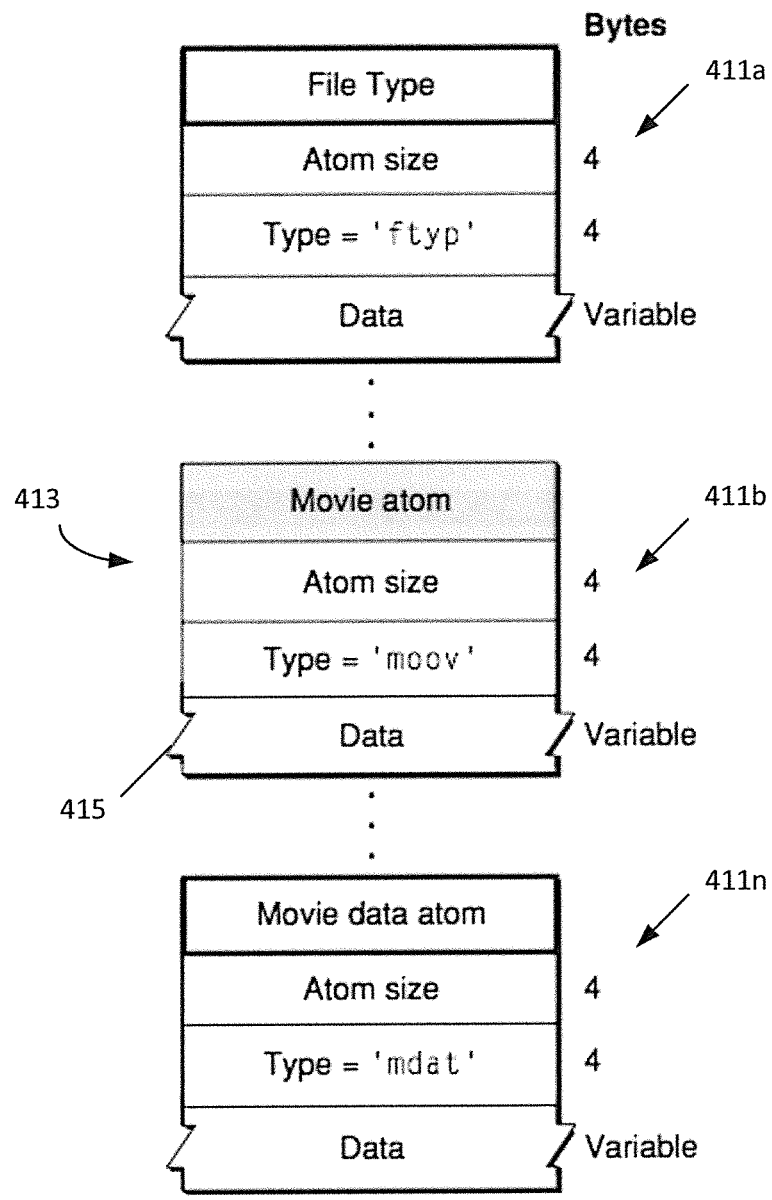
FIG. 4 illustrates another example layout of a file for audiovisual information.

FIG. 4 illustrates another example layout of a file containing audiovisual information. In the example of FIG. 4, the file includes a plurality of portions 411a-n. Each of the portions, taking the portion 411b as an example, includes metadata 413 and audiovisual data 415. The metadata 413, as illustrated in FIG. 4, includes movie atom data.

Figure 5:
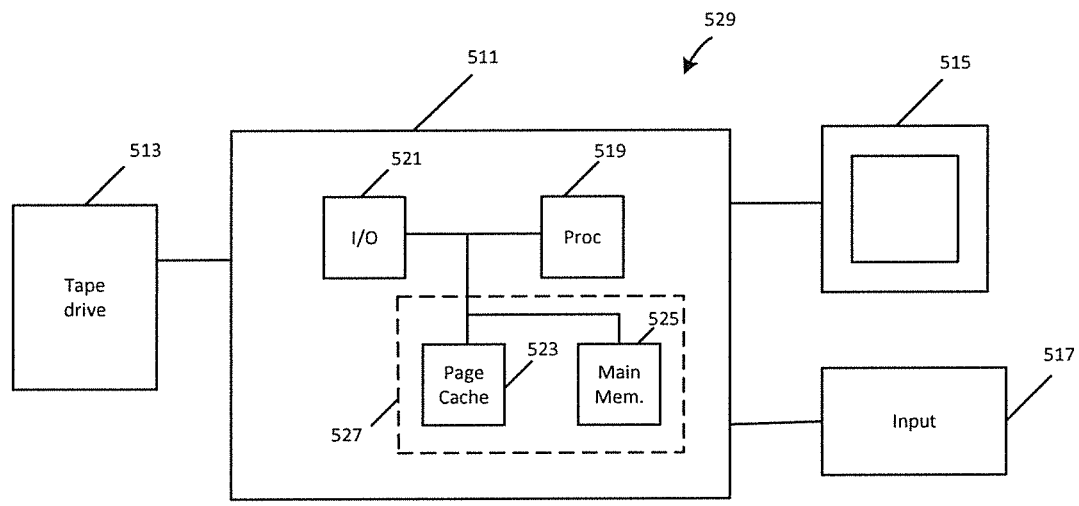
FIG. 5 is a block diagram of a further embodiment of a system in accordance with aspects of the invention.

FIG. 5 is a block diagram of a further embodiment of a system in accordance with aspects of the invention. In the embodiment of FIG. 5, a workstation 529 is coupled to a tape drive 513. The workstation includes a display device 515, a user input device 517, and a housing 511 for computer hardware, including a processor 519, I/O circuitry 521, and memory 527. The memory includes a main memory 525 and a page cache 523. In some embodiments the page cache may be part of the main memory. In some embodiments the memory may also include additional storage, for example a storage device such as a hard drive, disk drive, or other electronic or electromagnetic storage device. The processor is preferably programmed by program instructions stored in the memory to perform processing of audiovisual information, for example transcoding or video editing. The processor is also programmed by program instructions stored in the memory to command writing and reading of files containing audiovisual information to a tape in the tape drive. In some embodiments the tape drive may be connected directly to the workstation, as illustrated in FIG. 5, but in various embodiments the tape drive may be accessible to the workstation over a network, for example a local area network or alternatively a wide area network, for example the Internet. In most embodiments the tape is a LTO tape, for example LTO-5, LTO-6, LTO-7, or LTO-8, supporting a Linear Tape File System (LTFS).

In operation, when commanding writing of a file containing audiovisual information to the tape, or in some embodiments whenever the file is opened (or saved or modified in some embodiments) using an application configured to directly or indirectly command writing of the file to tape (and/or reading of the file from tape in some embodiments), the processor determines information relating to items within the file that would be subject to a non-sequential read operation when read from the tape. The items may be for example, metadata concerning the audiovisual information. In some embodiments the information specifies objects and an offset value indicating their position in the file. In some embodiments the information additionally includes the information of the item. In some embodiments the processor writes the information, which in some embodiments may be considered a random access database, to memory of the workstation. In some embodiments the processor, in addition or instead, commands writing of the information to network accessible memory. In some embodiments the processor creates the information prior to commanding writing of the file to tape, or upon first reading the file from tape. In some embodiments, and generally more conveniently, the processor writes the information upon completion of writing the file to tape, while the file remains in memory of the workstation. In some embodiments the processor additionally, or instead, commands writing of the information to the tape.

When commanding reading of a file containing audiovisual information from the tape, the processor reads the information of items, which may be in a random access database, expected to be normally read in a non-sequential manner when reading the file from tape. The random access database may be stored locally at the workstation, for example if the workstation commanded writing of the file to tape, or the random access database may be read from a shared memory, for example accessible over a network. In some embodiments the processor may command reading of the random access database for the file from the tape.

In embodiments in which the random access database does not include the information of the items, but instead specifies the position on the tape of the items, in commanding read of the file containing audiovisual information from the tape, the processor first commands reading of segments of the tape. Each of the segments begins at a tape position indicated by an offset in the memory map associated with metadata in the file. The processor stores information of the segments in the memory cache of the workstation. In some embodiments the information of the segments is stored in a normal course of operation of the processor in obtaining information of the segments from the tape. In some embodiments the processor is programmed to explicitly command storage of the information of the segments in the cache.

During reading of the file containing audiovisual information from the tape, audiovisual data is read from the tape. During reading of the audiovisual data, metadata is also to be accessed. The metadata, or some of it and possibly other data, may be stored on the tape in a position that does not allow for the metadata to be read as part of a complete sequential read of the tape. Instead, reading of the metadata may require the tape to be advanced or returned by some additional amount, in effect resulting in a random access read of the tape to obtain the metadata, or some of it or possibly other data, all of which may be considered non-sequentially read data. As the non-sequentially read data is already stored in the non-tape memory of the workstation due to being in the random access database or due to being previously read from the tape, accesses to the non-sequentially read data are to the memory of the workstation, for example the cache, rather than reading or rereading the non-sequentially read data from the tape. In some embodiments, reading of the file from the tape is significantly faster as multiple seeks to the non-sequentially read data during reading of the file may be avoided.

In some embodiments, after reading the file, the workstation performs a process on the audiovisual information. In some embodiments the process is transcoding of the audiovisual information. In some embodiments the process is performance of video editing operations on the audiovisual information.

Figure 6:
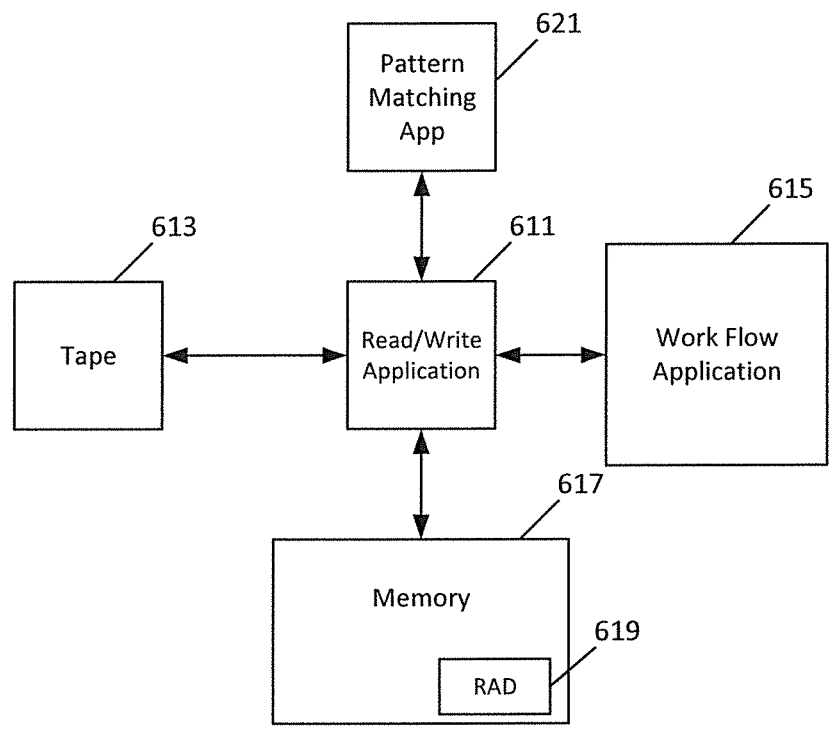
FIG. 6 is a further block diagram of a further embodiment of a system in accordance with aspects of the invention.

FIG. 6 is a further block diagram of a further embodiment of a system in accordance with aspects of the invention. In FIG. 6, a read/write application 611 is configured to read and/or write information from and/or to tape and to read and write information from non-tape memory 617. The read/write application may be one or more software modules, for example executing on one or more processors, for example of a server or workstation, for example those of FIG. 1 or 5. The tape may be, for example, an LTO compliant tape, and utilizing LTFS. The non-tape memory may be computer random access memory (RAM) of or accessible to the workstation or server, although in some embodiments the memory may be that of a computer memory storage disk, or flash or other solid state drive (SSD).

The read/write application is in communication with a work flow application 615. The work flow application may provide for performing operations on data, for example editing or other modification of audiovisual information, or performing other operations on other data, depending on a particular work flow application used. In some embodiments the work flow application is accessed or called by the read/write application, for example in response to a user input, and in some embodiments the read/write application may be accessed by way of the work flow application, depending on how the various applications may be configured. Further, in some embodiments the read/write application may be located on another device than the work flow application. For example, the work flow application may be located on a workstation while the read/write application may be located on a server coupled to the workstation by the Internet, with the server coupled to the tape drive.

In some embodiments an audiovisual file is stored in the memory, and the read/write application is requested to open or perform an operation using the file, either directly or by way of the work flow application. The read/write application may open the file, with the read/write application also receiving an indication of memory addresses read as part of opening the file. In some embodiments an operating system (not shown) may provide the indication of memory addresses read, for example as the memory is read. In some embodiments the indication of memory addresses read may be in terms of pages and offsets, or in terms of frames and offsets, or in some other terms. In some embodiments the memory addresses are addresses in virtual memory, although in some embodiments the memory addresses may be physical memory addresses. In the event the memory is SSD, in most embodiments the memory addresses may be other than the actual memory addresses of the SSD, with the memory addresses instead being those as seen by the operating system, which will generally not be aware of SSD translation of addresses for write leveling or other purposes.

The read/write application stores the indications of memory addresses, or in some embodiments simply an offset from a beginning address of the file, in a random access database 619 within the non-tape memory. In some embodiments the read/write application stores the indications of all memory addresses read. In some embodiments the read/write application only stores memory addresses read when the addresses indicate a non-sequential read in memory. In some such embodiments the read/write application only stores such addresses if subsequent reads from memory indicate that the non-sequential read in memory is followed by a sequential read in memory of less than a predefined length. In some embodiments the read/write application also stores data for the memory addresses when the addresses indicate a non-sequential read in memory. In some such embodiments the read/write application stores data for those memory addresses, and some subsequent sequential addresses, for example for a predefined length or to an end of a memory block, etc.

In some embodiments the read/write application is also in communication with a pattern matching application. In some embodiments the pattern matching application may be part of the read/write application. In some embodiments the read/write application provides the pattern matching application an indication of the memory addresses read. In some embodiments the read/write application provides the pattern matching application an indication of beginning locations for each non-sequential read of memory. In some embodiments the read/write application also provides the pattern matching application an indication of some the data following each non-sequential read of memory.

In some embodiments the pattern matching application compares the location (and subsequent read length in many embodiments) to known patterns for non-sequential reads for files containing different types of information, or files containing information in different formats. For example, a file for audiovisual information may contain audiovisual information encoded in various formats, the formats may include different locations and uses for metadata, etc. In various embodiments the pattern matching application provides the read/write application information as to the format of the data in the file.

In some embodiments the pattern matching application may instead or in addition indicate to the red/write application which of the non-sequential reads indicated by the memory addresses will be actual non-sequential reads when reading the file from tape, as opposed to apparent non-sequential reads when reading the file from non-tape memory. Further, in some embodiments, the pattern matching application may process information relating to only part of a file, and determine a format for the file based on that partial information. In such embodiments the read/write application (or the pattern matching application) may extrapolate from that information, and also possibly a total size of the file or other metadata of the file, expected locations for non-sequential reads when reading the file from tape.

In some embodiments the read/write application receives information from the pattern matching application prior to writing offset information for the file or data information of the file to the random access database. For example, in some embodiments the read/write application may rely on information from the pattern matching application in determining which offsets and/or data should be written to the random access database.

Figure 7:
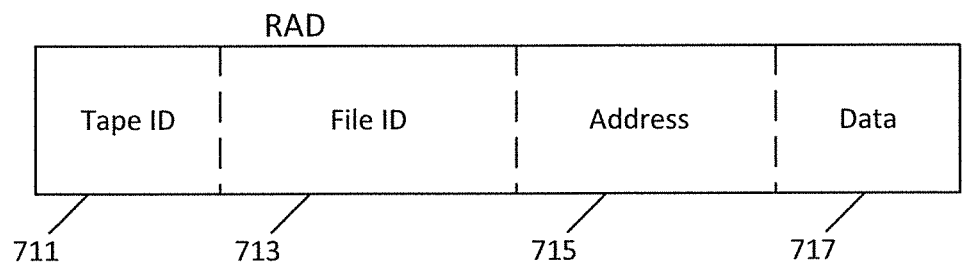
FIG. 7 is a diagram indicating fields of a random access database, in accordance with aspects of the invention.

FIG. 7 is a diagram indicating fields of a random access database, in accordance with aspects of the invention. In various embodiments some of the fields may not be used, and in various embodiments other fields may be used in addition or instead.

A first field 711 identifies a tape in which a file is stored. In various embodiments the first field may also identify a starting position of the file in the tape. A second field 713 identifies the file. A third field 715 identifies a location, for example a beginning location, of non-sequentially read information of the file. In some embodiments a further field (not shown) may indicate an ending location for the non-sequentially read information, for example assuming that non-sequentially read information occupies a discrete number of addresses. A fourth field 717 stores data from the file that is the non-sequentially read information (the non-sequentially read information may include the information at the first non-sequentially read address, and all data thereafter until a return to the address immediately after the jump to the first bit, byte or other unit of each non-sequentially read information). In some embodiments the fourth field is optional.

Figure 8:
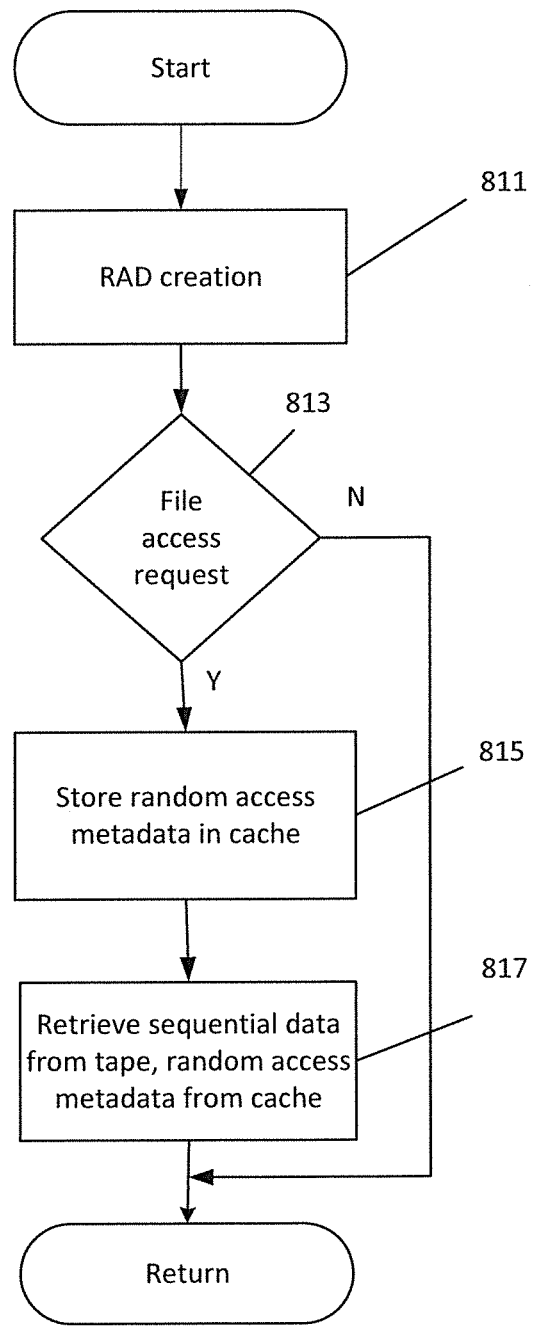
FIG. 8 is a flowchart of a process in accordance with aspects of the invention.

FIG. 8 is a flowchart of a process in accordance with aspects of the invention. In some embodiments the process is performed by a system as discussed with respect to FIG. 1 or 5. In some embodiments the process is performed by a workstation, for example as discussed with respect to FIG. 1 or 5. In some embodiments the process is performed by a processor, for example as programmed by program instructions.

In block 811 the process creates a random access database for an audiovisual file (or in some embodiments creates entries in a random access database for the audiovisual file). In some embodiments the random access database specifies locations of information in the file for information, for example some or all metadata, that would normally be the subject of a non-sequential read operation when reading the file from tape. In some embodiments the locations are specified as an offset from a beginning of the file. In some embodiments the offsets are specified as a number of bytes.

In some embodiments the random access database specifies not just the locations of such information in the file, but also, or instead in some embodiments, the information itself.

In block 813 the process determines if access to an audiovisual file on tape is requested. If so, the process continues to block 815, otherwise the process returns.

In block 815 the process stores the information that would normally be the subject of a non-sequential read operation when reading the file from tape in cache memory of a workstation, with the information for convenience sometimes being termed herein non-sequentially read or accessed information or randomly accessed information. In some embodiments the process determines locations of the non-sequentially read information on the tape using the random access database, and in some embodiments the process commands reads of segments of tape beginning at locations of the non-sequentially read information. In some embodiments the process stores the metadata in the cache memory as part of a process of reading the non-sequentially read information from the tape. In some embodiments the process explicitly commands storage of the metadata in the cache memory. In some embodiments the process stores the random access database, or pertinent portions of it, in the cache memory.

In block 817 the process retrieves audiovisual information of the file from tape, with the process retrieving the non-sequentially read information of the file from cache memory. In some embodiments, the process retrieves a plurality of objects of audiovisual information from the tape, with retrieval of the non-sequentially read information, in the context of retrieving the objects of audiovisual information, fulfilled by reading the non-sequentially read information from the memory cache.

The process thereafter returns.

Figure 9:
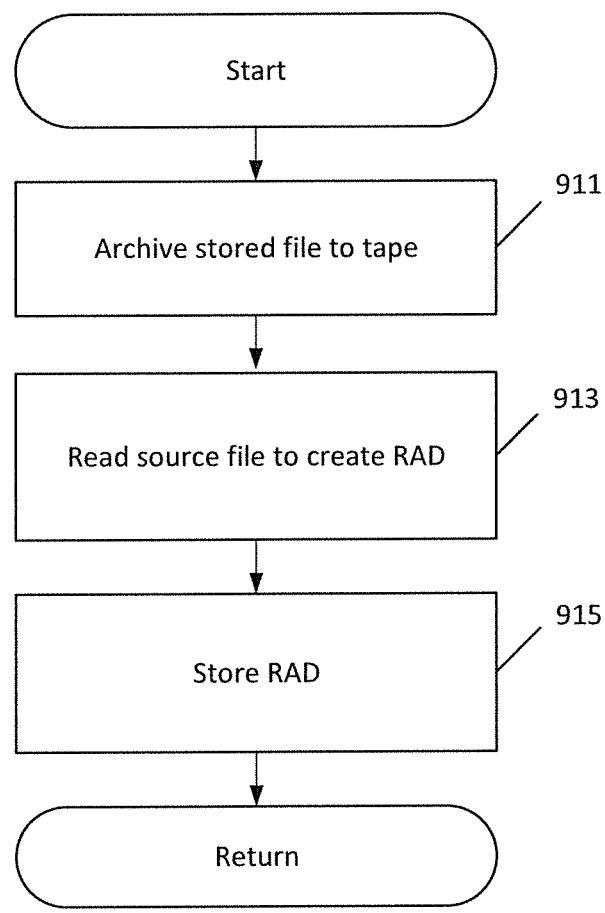
FIG. 9 is a flowchart of a process associated with writing a file to tape in accordance with aspects of the invention.

FIG. 9 is a flowchart of a process associated with writing a file to tape in accordance with aspects of the invention. In some embodiments the process is performed by a system as discussed with respect to FIG. 1 or 5. In some embodiments the process is performed by a workstation, for example as discussed with respect to FIG. 1 or 5. In some embodiments the process is performed by a processor, for example as programmed by program instructions. In some embodiments the process performs operations of block 811 of the process of FIG. 8.

In block 911 the process archives a file containing audiovisual information to tape. In some embodiments the tape is an LTO-compliant tape implementing an LTFS. In some embodiments a workstation contains the file in local storage of the workstation, and the workstation commands writing of the file to the tape. In some embodiments a tape drive writes the file to tape.

In block 913 the file is read to create a random access database, or entries in a random access database, for non-sequentially read items in the file. In some embodiments the file is stored in local storage of the workstation. In some embodiments the random access database specifies values indicative of locations of the non-sequentially read information in the file. In some embodiments the values indicative of locations in the file are offsets. In some embodiments the offsets are offsets from a first byte of the file. In some embodiments the offsets are some other direct or indirect offset.

In block 915 the process stores the random access database. In some embodiments the random access database is stored in local memory of the workstation. In some embodiments the random access database is stored in memory of a network device. In some embodiments the random access database is stored by writing the random access database to tape, which in some embodiments is the same tape to which the file was written.

The process thereafter returns.

Figure 10:
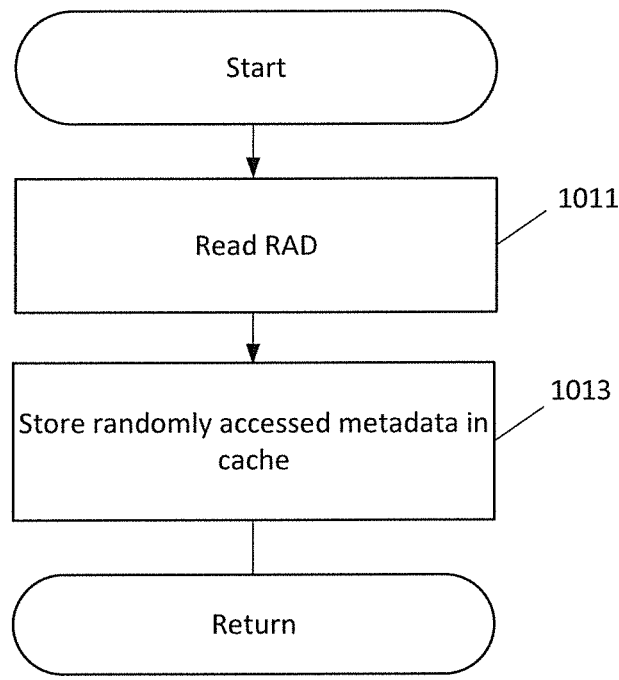
FIG. 10 is a flowchart of a process associated with retrieving a file from tape in accordance with aspects of the invention.

FIG. 10 is a flowchart of a process associated with retrieving a file from tape in accordance with aspects of the invention. In some embodiments the process is performed by a system as discussed with respect to FIG. 1 or 5. In some embodiments the process is performed by a workstation, for example as discussed with respect to FIG. 1 or 5. In some embodiments the process is performed by a processor, for example as programmed by program instructions. In some embodiments the process performs operations of block 815 of the process of FIG. 8.

In block 1011 the process reads a random access database, or entries of a random access database, for a file stored on tape. In some embodiments the random access database is stored in local memory of the workstation. In some embodiments the random access database is stored on a network accessible storage device. In some embodiments the random access database is stored on the tape. In various embodiments the random access database indicates locations of non-sequentially read information stored on the tape. In some embodiments the random access database instead or in additions stores the non-sequentially read information of the tape.

In block 1013 the process stores the non-sequentially read information in cache memory of the workstation. In some embodiments the non-sequentially read information is read from the tape. In some embodiments the non-sequentially read information is from the random access database.

The process thereafter returns.

Figure 11:
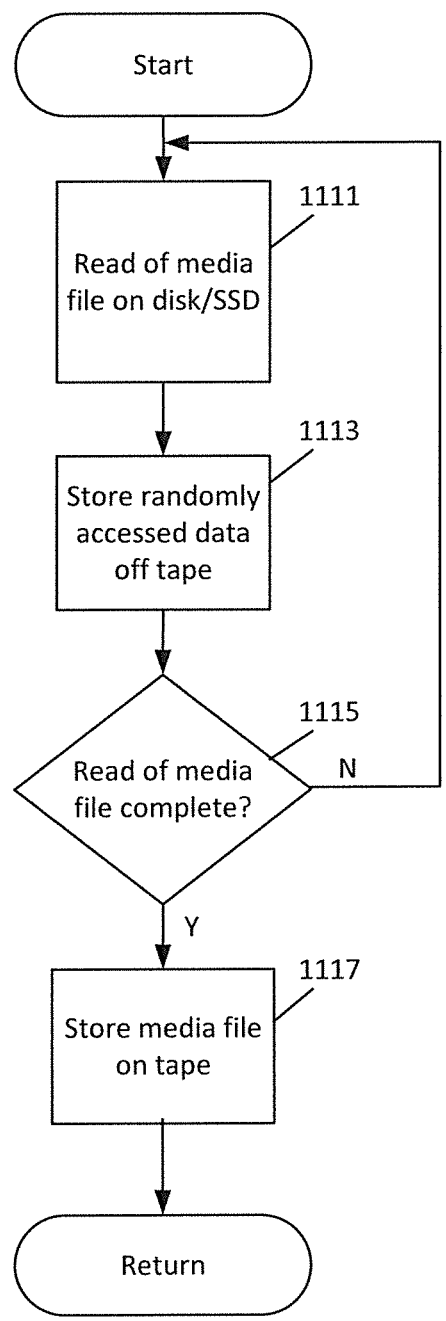
FIG. 11 is a flowchart of a process associated with preparing a file stored on tape for utilizing off-tape information in reducing non-sequential reads of information from the file on tape, in accordance with aspects of the invention.

FIG. 11 is a flowchart of a process associated with preparing a file stored on tape for utilizing off-tape information in reducing non-sequential reads of information from the file on tape, in accordance with aspects of the invention. In some embodiments the process is performed by the system of FIG. 1 or 5. In some embodiments the process is performed by the read/write application of FIG. 6. In some embodiments the process is performed by a processor configured by program instructions.

In block 1111 the process begins reading a file, for example a media file, in memory of or coupled to a workstation. The memory may be RAM of the workstation, or in some embodiments disk memory or SSD memory. In block 1113 the process stores information of the file that was the subject of a random access, as opposed to sequential access, read of the memory. In some embodiments the process stores a predefined or predetermined amount of information of the file that follows a first address of the random access read of the memory. For example, in some embodiments a block of data or a page of data is stored. In some embodiments the information is stored in a random access database.

In block 1115 the process determines if read of the file is complete. If not, the process returns to block 1111 and continues reading of the file. Otherwise the process continues to block 1117.

In block 1117 the process stores the file on tape. The process thereafter returns.

Figure 12:
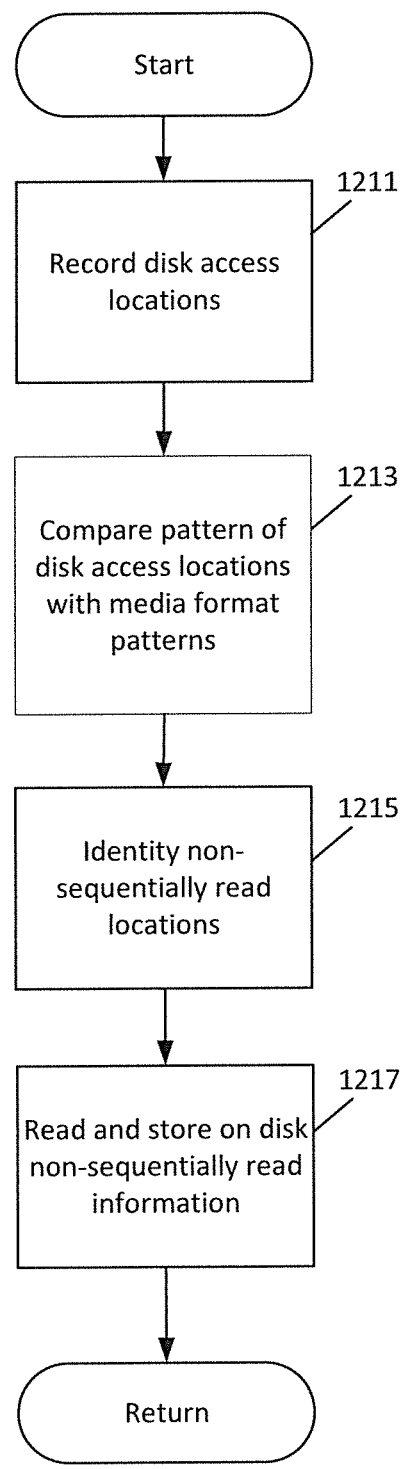
FIG. 12 is a flowchart of a process for obtaining non-sequential read information for a file to be stored on tape, in accordance with aspects of the invention.

FIG. 12 is a flowchart of a process for obtaining non-sequential read information for a file to be stored on tape, in accordance with aspects of the invention. In some embodiments the process is performed by the system of FIG. 1 or 5. In some embodiments the process is performed by the read/write application and/or pattern matching application of FIG. 6. In some embodiments the process is performed by a processor configured by program instructions.

In block 1211 the process records memory access locations during reads of a file, for example a file containing audiovisual information. In some embodiments the memory access locations are locations in virtual memory of a computer. In some embodiments the memory access locations are locations in physical memory of a computer.

In block 1213 the process compares a pattern for the memory access locations with patterns for different formats for the type of information stored by the file. For example, if the file contains audiovisual information, the pattern for the memory access locations may be compared with patterns for known formats for various audiovisual formats.

In block 1215 the process identifies memory access locations for or related to non-sequentially read information. In some embodiments the identification is performed using the results of the pattern comparisons. In some embodiments the identification is performed using the results of the pattern comparisons and the record of memory access locations. In some embodiments the results of the pattern matching is used to eliminate candidate non-sequential reads. In some embodiments the results of the pattern matching is used to supplement identified non-sequential reads.

In block 1217 the process stores the information of the file for the memory access locations for or related to non-sequentially read information in non-tape memory. In some embodiments the process stores such information in a random access database.

The process thereafter returns.

Although the invention has been discussed with respect to various embodiments, it should be recognized that the invention comprises the novel and non-obvious claims supported by this disclosure.

What is claimed is:

1. A method useful in relation to processing of files containing audiovisual information, comprising:
   writing a source file containing audiovisual information stored in non-tape memory to a tape; and
   reading the source file from memory to obtain information relating to non-sequentially accessed information of the file;
   determining locations of at least some of the non-sequentially accessed information of the file;
   comparing the locations to patterns for non-sequential reads for files containing audiovisual information in different formats to determine a matching pattern;
   using the matching pattern to determine which of the information relating to non-sequentially accessed information is information relating to non-sequentially accessed metadata information; and
   storing the information relating to non-sequentially accessed metadata information of the file in memory other than the tape.

2. The method of claim 1, wherein the information relating to non-sequentially accessed metadata information comprises an address of the non-sequentially accessed metadata information and the non-sequentially accessed metadata information.

3. The method of claim 2, wherein the information relating to non-sequentially accessed metadata information is stored in a database in the memory other than the tape.

4. The method of claim 2, further comprising commanding reading of the file containing audiovisual information from the tape, with commanded reads of the metadata fulfilled from the memory other than the tape.

5. The method of claim 1, wherein the audiovisual information in the file is at least one thousand times larger than the metadata in the file.

6. The method of claim 1, wherein the information relating to non-sequentially accessed metadata information comprises an address of the non-sequentially accessed metadata information and a block of data starting at that address.

* * * * *